United States Patent [19]

Natale

[11] Patent Number: 4,705,429

[45] Date of Patent: Nov. 10, 1987

[54] METHOD OF DISPOSING OF ASBESTOS WASTE MATERIAL

[75] Inventor: Anthony Natale, Maple Shade, N.J.

[73] Assignee: GPAC, Inc., Cinnaminson, N.J.

[21] Appl. No.: 850,125

[22] Filed: Apr. 10, 1986

[51] Int. Cl.⁴ .............................................. B09B 1/00
[52] U.S. Cl. ...................................... 405/128; 241/4; 423/DIG. 18; 405/258
[58] Field of Search ................ 405/128, 129, 258, 263, 405/264, 267; 423/DIG. 18; 241/4

[56] References Cited

U.S. PATENT DOCUMENTS

| | | |
|---|---|---|
| Re. 20,056 | 8/1936 | McCarthy . |
| 1,935,090 | 11/1933 | Holland ............................... 405/129 |
| 3,196,619 | 7/1965 | Shock . |
| 3,440,824 | 4/1969 | Doolin .............................. 405/267 |
| 3,446,026 | 5/1969 | Fiske . |
| 3,466,873 | 9/1969 | Present . |
| 3,500,934 | 3/1970 | Magnuson ...................... 405/267 X |
| 3,583,164 | 6/1971 | Sherrill . |
| 3,586,624 | 6/1971 | Larson ............................... 405/129 |
| 3,614,867 | 10/1971 | Nieman ............................. 405/129 |
| 3,705,851 | 12/1972 | Brauer ........................... 405/129 X |
| 3,775,984 | 12/1973 | Livingston ......................... 405/128 |
| 3,852,967 | 12/1974 | Stewart et al. . |
| 3,892,076 | 7/1975 | Oudenhoven . |
| 3,992,986 | 11/1976 | Sutton ............................ 405/129 X |
| 4,101,333 | 7/1978 | Wayment ...................... 405/267 X |
| 4,166,709 | 9/1979 | Valiga . |
| 4,320,994 | 3/1982 | Mallon .............................. 405/267 |
| 4,362,434 | 12/1982 | Valiga et al. . |
| 4,375,985 | 3/1983 | Guillaud et al. ...................... 106/84 |
| 4,428,700 | 1/1984 | Lennemann . |
| 4,438,977 | 3/1984 | Chapel ........................... 299/12 X |

FOREIGN PATENT DOCUMENTS

| | | | |
|---|---|---|---|
| 3041706 | 5/1982 | Fed. Rep. of Germany ...... 405/128 |
| 3347234 | 7/1985 | Fed. Rep. of Germany ...... 405/129 |
| 0130304 | 3/1978 | German Democratic Rep. ................................. 405/129 |
| 0132633 | 10/1978 | German Democratic Rep. ................................. 405/129 |
| 2167682 | 6/1986 | United Kingdom .................. 241/4 |

OTHER PUBLICATIONS

Operating a Sanitary Fill at Fresno, Calif., Civil Engineering, vol. 9, No. 12, Dec. 1939, p. 746.
Lake Asbestos of Quebec, Ltd., Engineering and Mining Journal, vol. 159, No. 11, p. 186, Nov. 1958.
"Use of Abandoned Strip Mines for Disposal of Solid Waste in Maryland", Maryland Department of Health and Mental Hygiene, U.S. Department of Commerce, National Technical Information Service, Jun. 1973.
"Asbestos Waste Management Guidance", United States Environmental Protection Agency, Office of Solid Waste, May 1985.
"Evaluation of a Commercial Vacuum System for the Removal of Asbestos", EPA-600 2-80-088, May 1980.

Primary Examiner—Dennis L. Taylor
Attorney, Agent, or Firm—Fleit, Jacobson, Cohn & Price

[57] ABSTRACT

An abandoned or inactive portion of an asbestos open pit or underground shaft mine is used to permanently bury asbestos waste material produced from asbestos mining, asbestos processing and building demolition or renovation. The asbestos waste material is deposited in the mine, preferrably, in sealed containers and covered with tailings or non-asbestos material, such as soil or the like. As the asbestos waste material is deposited in the mine, it is covered with a layer of tailings or non-asbestos material within any twenty-four hour period. This procedure is repeated until the mine if filled and ultimately covered with a layer of non-asbestos material. A layer of vegetation is then planted on top of the former mine site.

18 Claims, 7 Drawing Figures

METHOD OF DISPOSING OF ASBESTOS WASTE MATERIAL

BACKGROUND OF THE INVENTION

1. Field of Invention

The present invention relates to the disposal of waste materials which include asbestos fibers. By the present invention, waste materials which includes asbestos are permanently buried in an abandoned or inactive portion of an asbestos open pit or underground shaft mine.

2. Background and Prior Art

Both the Environmental Protection Agency (EPA) and the Occupational Safety and Health Administration (OSHA) have been concerned with the potential human health hazards associated with exposure to asbestos since the early 1970s. The concern is based on medical evidence relating the exposure of airborne asbestos by asbestos workers and their families to causing various types of cancer as well as noncancerous respiratory diseases.

Figure 1:
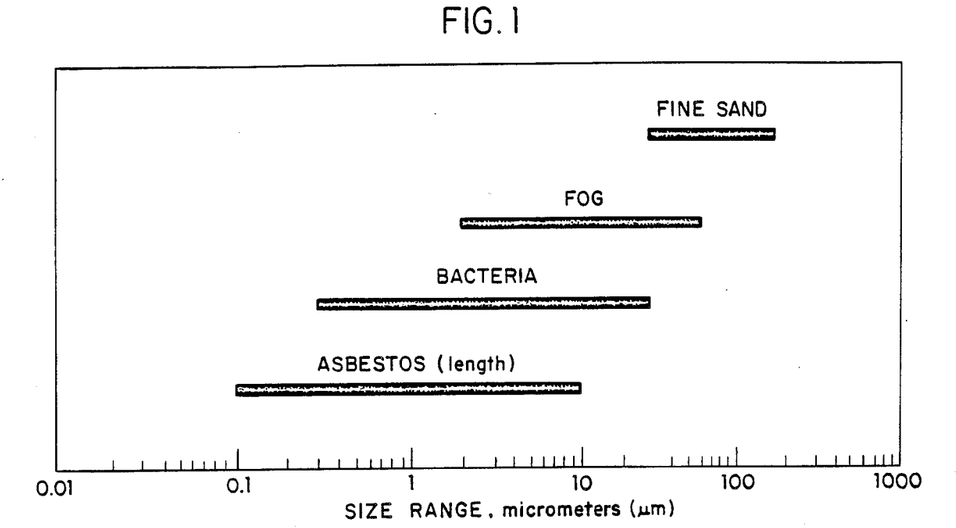
FIG. 1 is a graph comparing asbestos fiber size with other materials.

Asbestos is a naturally occurring family of fibrous mineral substances. The typical size of respirable asbestos fibers, as illustrated relative to other substances in FIG. 1, is 0.1 to 10 microns in length, a size that is not generally visible to the human eye. Asbestos fibers occur naturally and are sold in many ranges of lengths greater than the 0.1 to 10 micron length. Respirable asbestos fibers, when disturbed, may become suspended in the air for many hours, thus increasing the extent of asbestos exposure for individuals within the area.

EPA regulations identify the following types of asbestos: chrysotile, amosite, crocidolite, anthophyllite asbestos, actinolite asbestos, and tremolite asbestos. Approximately 95 percent of all asbestos used in commercial products is chrysotile.

Asbestos became a popular commercial product because it is noncombustible, resistant to corrosion, has a high tensile strength, and some groups of asbestos fibers have a low electrical conductivity. However, asbestos had very little use until the early 1900s when it was employed as thermal insulation for steam engines. Since then, asbestos fibers have been mixed with various types of binding materials to create an estimated 3,000 different commercial products. Asbestos has been used in brake linings, floor tile, sealants, plastics, cement pipe, cement sheet, paper products, roofing products, textile products, and insulation. The amount of asbestos contained in these products varies significantly, from 1 to 100 percent, depending on the particular use.

The potential of an asbestos-containing product to release fibers to the environment is dependent upon its degree of friability. Friable means that the material can be crumbled with hand pressure. Therefore, asbestos containing materials, when friable, are likely to emit fibers. The fibrous or fluffy spray-applied asbestos materials found in many buildings for fireproofing, insulating, sound proofing, or decorative purposes are generally considered friable. Pipe and boiler wrap are also friable and found in numerous buildings.

Some materials, such as vinyl-asbestos floor tile, are considered nonfriable and generally do not emit airborne fibers unless subjected to sanding or sawing operations. Other materials, such as asbestos cement sheet and pipe, can emit asbestos fibers if the materials are subjected to breakage or crushing in the demolition or renovation of structures that contain such materials. For this reason, such materials are considered friable under the National Emission Standards for Hazardous Air Pollutants (NESHAP) regulations for the demolition of structures.

Medical studies of asbestos-related diseases have revealed that the primary exposure route is inhalation. Also, the studies suggest that there does not appear to be a safe level of exposure (e.g., a threshold) below which there would be no chance of disease.

EPA, MSHA and OSHA have major responsibility for regulatory control over exposure to asbestos. Emissions of asbestos to the ambient air are controlled under Section 112 of the Clean Air Act, which establishes the National Emission Standards for Hazardous Air Pollutants (NESHAPs). The regulations specify control requirements for most asbestos emissions, including work practices to be followed to minimize the release of asbestos fibers during handling of asbestos waste materials. These regulations do not identify a safe threshold level for airborne asbestos fibers.

The OSHA regulations are established to protect workers handling asbestos or asbestos-containing products. The current OSHA regulations include a maximum workplace airborne asbestos concentration limit of 2 fibers/cc on an 8-hour time weighted average basis, and a ceiling limit of 10 fibers/cc in any 15-minute period. The standard includes requirements for respiratory protection and other safety equipment, and work practices to reduce indoor dust levels. MSHA regulations protect miners exposed to asbestos contamination.

Wastes containing asbestos are not classified as "hazardous wastes" under the federal Resource Conservation and Recovery Act (RCRA). However, because state regulations can be more restrictive than the federal regulations under RCRA, some states are contemplating listing asbestos-containing wastes as hazardous wastes.

Asbestos has been mined and used commercially in the United States since the early 1900s. U.S. consumption of asbestos increased to a peak of 800,000 tons per year in the early 1970s. Since then, consumption has dropped by more than 70 percent. However, much of the material originally installed in buildings may still be present.

Some typical uses of asbestos for brake linings are in automobiles, buses, trucks, railcars, and industrial machinery, and in vehicle or industrial clutch linings. Asbestos-containing brake linings include drum brake linings, disc brake pads, and brake blocks. In the past, asbestos linings have accounted for up to 99 percent of this market. Friction materials are generally tough and nonfriable, but they release asbestos dust during fabrication operations. In addition, accumulated dust in a brake drum from lining wear contains asbestos. Thus, brake installation facilities (e.g., city bus service centers, tire and brake shops) generate significant quantities of asbestos waste. Safe transport and permanent disposal of this waste has been a problem of the industry.

Plastic products which contain asbestos include resilient vinyl and asphalt floor coverings, asphalt roof coatings, and traditional molded plastic products such as a cooking pot handle or plastic laboratory sink. The products in this category are usually tough and inflexible. The asbestos in these products is tightly bound and is not released under typical conditions of use. However, any sawing, drilling, or sanding of these products during installation or removal results in the release of asbestos dust and potentially harmful asbestos waste products.

Asbestos-cement (A-C) pipe has been widely used for water and sewer mains, and is occasionally used for electrical conduits, drainage pipe, and vent pipes. Asbestos-cement sheet, manufactured in flat or corrugated panels and shingles, has been used primarily for roofing and siding, but also for cooling tower fill sheets, canal bulkheads, laboratory tables, and electrical switching gear panels. The asbestos in these products is tightly bound, and would not be released to the air under typical conditions of use.

However, any sawing, drilling or sanding of these products during installation or renovation could result in release of asbestos dust. In addition, the normal breakage and crushing involved in the demolition and renovation of structures can release asbestos fibers from these materials. For this reason they are subject to the NESHAPs regulation during demolition and renovation operations. Also, normal use of A-C pipe for water or sewer mains has been shown to release asbestos fibers to the fluid being carried. Therefore, an ongoing process has been initiated to replace A-C pipe products. A problem has arisen with finding a suitable permanent disposal site for these waste products.

Roofing felts, gaskets, and other paper products are manufactured on conventional papermaking equipment using asbestos fibers instead of cellulose. The raw asbestos paper produced in this process has a high asbestos content (approximately 85 percent), but is typically coated or laminated with other materials in the final product. The asbestos fibers in most paper products are sufficiently bound to prevent their release during normal product use.

However, cutting or tearing the material during installation, use, or removal can result in the release of asbestos dust. Therefore, the asbestos waste products created during demolition or renovation of a building, to remove the potentially harmful asbestos waste products, have presented a problem of finding a safe, permanent disposal site.

Asbestos yarn, cloth and other textiles are made using conventional textile manufacturing equipment. These materials are used to manufacture fire-resistant curtains or blankets, protective clothing, electrical insulation, thermal insulation, and packing seals. The raw textile products have a high asbestos content (approximately 85 percent). However, they are typically coated or impregnated with polymers before assembly into a final product, which is not required to be labeled as containing asbestos and typically is not so labeled. These products may release asbestos dust if cut or torn, or for some products, during normal use. There still remains a significant quantity of non-coated asbestos fabrics in use, especially in schools and fire departments. The ongoing process of eliminating these fabrics has created a vast source of asbestos-containing waste materials.

Asbestos-containing thermal insulation generally refers to sprayed and trowelled asbestos coatings, and molded or wet-applied pipe coverings. These materials generally have an asbestos content of 50 to 80 percent. The coatings were commonly applied to steel I-beams and decks, concrete ceilings and walls, hot water tanks and boilers. The coatings were applied primarily for thermal insulation, although in many cases the coating also provided acoustical insulation and a decorative finish.

Sprayed coatings typically have a rough, fluffy appearance, while trowelled coatings have a smooth finish and may be covered with a layer of plastic or other non-asbestos material. Both sprayed and trowelled asbestos coatings are considered friable in most applications. Most spray-applied asbestos coatings were banned for fireproofing/insulating in 1973, and for decorative purposes in 1978. Efforts are presently underway to remove these coating from schools and other public buildings to avoid the possibility of airborne asbestos contamination.

Asbestos insulation board was used as a thermal/fireproofing barrier in many types of walls, ceilings, and ducts or pipe enclosures. This material looks like A-C sheet, but is less dense and much more friable. High asbestos dust levels have been measured for many board handling operations, including a simple unloading of uncut sheets. These sheets are presently being removed from public places.

Preformed pipe coverings having an asbestos content of about 50 percent were used for thermal insulation on steam pipes in industrial, commercial, institutional, and residential applications. The installation of wet-applied and preformed asbestos insulation was banned in 1975; however, significant amounts are typically found in older structures.

Preformed block insulation was used as thermal insulation on boilers, hot water tanks, and heat exchangers in industrial, commercial, institutional, and residential applications. Asbestos block insulation is friable and rapidly deteriorates in a high humidity environment or when exposed to water. The installation of this type of asbestos insulation was banned by EPA in 1975.

Other uses of asbestos have included: exterior siding shingles, shotgun shell base wads, asphalt paving mix, spackle and joint patching compounds, artificial fireplace logs for gas-burning fireplaces, and artificial snow. The use of asbestos as artificial logs in gas-burning fireplace systems was banned in 1977, while the use of asbestos as an ingredient in spackle and joint compounds was banned in 1978.

Asbestos-containing wastes are generated by a variety of processes, including mining and milling asbestos ore and manufacturing and fabricating asbestos products. In addition, ever increasing efforts are being made to remove all forms of asbestos from demolition or renovation operations to prevent exposure to the public of asbestos containing waste. This is generating huge quantities of waste materials which include asbestos contamination.

Asbestos is "manufactured" by mining the ore deposit and separating the fibers from the non-asbestos rock. Some of the active asbestos mines in the United States, are located near Copperopolis and Coalinga, Calif., and Hyde Park, Vt. Seven other mines which were closed in the 1970s are located across the United States with three in Arizona, two in California, and two in North Carolina.

The process of separating asbestos fibers from the mined ore, and grading and packaging these fibers according to length, is called milling. Mills also generate asbestos-containing waste from air cleaning control devices used to meet EPA and OSHA requirements. EPA requires all asbestos-containing wastes from mills to be disposed without any visible emissions to the outside air, or certain wetting practices must be used to control emissions.

Asbestos mines generate a large quantity of waste rock, called tailings, having insufficient asbestos content for additional processing. Additional tailings are produced by a milling process. Both types of tailing waste are typically piled in an area adjacent to the mine. Tailings are usually disposed by loading on a conveyor belt and dumping on an onsite waste pile. Overburden includes soil and other material which masks the ore and is usually included with the tailings pile. Emission control during transport and dumping of tailings is usually achieved by wetting, although local exhaust ventilation may occasionally be used.

Asbestos products are manufactured by combining the milled asbestos fibers with binders, fillers, and other materials. The resultant mixture, which may be either dry or wet, is molded, formed or sprayed, and then cured or dried. Some products require further machining or coating operations prior to their sale. Manufactured products may then be fabricated by another manufacturer, by the installer or final consumer.

Manufacturing and fabricating operations generate the following asbestos-containing wastes:
 (1) empty asbestos shipping containers;
 (2) process wastes such as cuttings, trimmings, and off-specification/reject material;
 (3) housekeeping waste from sweeping or vacuuming; and
 (4) pollution control device waste from dust capture systems.

Process and manufacturing wastes containing asbestos are wetted before packaging using a mixture of surfactant (e.g., soap) and water, in a fine mist. Empty shipping bags can be flattened and packaged under hoods exhausting to a pollution control device. Empty shipping drums are difficult to thoroughly clean, and should be sealed and disposed of or used to contain other asbestos wastes for disposal. Air pollution control device waste is usually packaged directly by connecting a container to the waste hopper outlet. Vacuum bags or disposable paper filters are not cleaned, but rather are sprayed with a fine water mist and placed intact into a proper container.

A very large quantity of asbestos-containing waste is currently generated from the removal of friable asbestos materials from buildings to be demolished or renovated. EPA regulations address the removal of friable asbestos materials prior to demolition or renovation of buildings in the Code of Federal Regulations (40 CFR Part 61, Subpart M). Removal is also considered for materials that may potentially become friable during the demolition or renovation activities. Currently, the federal regulations apply to larger structures, i.e., structures with more than four apartments, with certain minimum quantities of asbestos-containing material. However, some state and local health agencies require removal of lesser quantities of asbestos from smaller buildings.

When the asbestos materials are prepared for removal, they are wetted with a water and surfactant mixture sprayed in a fine mist, allowing time between sprayings for complete penetration of the material. Once the thoroughly wetted asbestos material has been removed from a building component, EPA and OSHA regulations require the wastes to be containerized as necessary to avoid creating dust during transport and disposal. The generally recommended containers are 6-mil thick plastic bags, sealed in such a way to make them leak-tight. More thorough containerization may include double bagging, plastic-lined cardboard containers or plastic-lined metal containers. Asbestos waste slurries can be packaged in leak-tight drums if they are too heavy for the plastic bag containers. Both EPA and OSHA specify that the containers be tagged with a warning.

The safe, permanent disposal of the enormous quantities of asbestos contained waste material currently being generated is becoming a major health and disposal problem. Current disposal of asbestos waste involves the isolation of the asbestos waste material in order to prevent fiber release to air or water. One recommended technique is landfilling by which the asbestos fibers are buried in soil. Other disposal techniques such as incineration or chemical treatment have not proven viable to date due to the unique properties of asbestos. EPA has established asbestos disposal requirements for active and inactive disposal sites under NESHAPs (40 CFR Part 61, Subpart M) and specifies general requirements for solid waste disposal under RCRA (40 CFR Part 257).

Recognizing the health dangers associated with asbestos exposure, the following procedures are recommended by the EPA to augment current EPA requirements for the burial of asbestos-containing waste:
 (1) A separate area is selected for asbestos waste disposal and a record is provided for future landowners that asbestos waste has been buried there and that it would be hazardous to attempt to excavate that area.
 (2) A trench is prepared to receive the asbestos wastes. The size of the trench will depend upon the quantity and frequency of asbestos waste delivered to the disposal site. The trenching technique allows application of soil cover without disturbing the asbestos waste containers. The trench should be ramped to allow the transport vehicle to back into it, and the trench should be as narrow as possible to reduce the amount of cover required. If possible, the trench should be aligned perpendicular to prevailing winds.
 (3) The asbestos waste containers are then carefully placed into the trench to avoid breaking them. Particular care should be exercised with plastic bags because when they break under pressure, asbestos particles can be emitted.
 (4) The containerized waste should then be completely covered within 24 hours with a minimum of 6 inches of non-asbestos material.

Current costs for the disposal of asbestos-containing waste are running at about a minimum of $40/cu. yd. with some disposal costs running as high as $159/cu. yd.

The problems discussed above are addressed and overcome by the present invention.

SUMMARY OF THE PRESENT INVENTION

The present invention provides a safe and economically viable method of disposing of hazardous waste material which contains asbestos. Asbestos containing waste material has created a significant public health hazard. The present invention provides for removing the asbestos containing waste material from the commercial source and transporting it to the site of a mine from which asbestos material was originally mined, placing the waste material in the mine, and, finally, covering the mine containing the waste material with non-contaminated material.

In accordance with the invention, two significant public health problems are overcome at once. First, the exposed surface of the asbestos mine is covered and, second, the asbestos containing waste material is permanently buried. In addition, the unsightly tailings from an asbestos mine operation can be buried in the mine along with asbestos-containing waste material.

It is contemplated to be within the scope of this invention, should regulations permit, to use tailings as interim cover layers for the waste material which includes asbestos. However, it is considered essential in final reclamation of a mine, that a top layer of non-asbestos material, such as soil, be of sufficient depth to isolate the buried asbestos and to provide a base for a vegetation layer.

By the method of the present invention, waste material which includes asbestos is deposited in an asbestos open pit or underground shaft mine. Soil or the mining tailings may be used to cover the waste material. If indicated by local or federal regulations, the waste material is finally covered with a non-asbestos material. This process is repeated until the asbestos mine is filled to a level equal to an existing ground surface grade. The covered mine is then revegetated and may be used for other purposes similar to those of a landfill.

By the method of the present invention, the present and potential problems concerning the permanent disposal of asbestos waste material have been overcome at an estimated cost of approximately $20/cu. yd.

It is an object of the present invention to safely dispose of waste material which includes asbestos.

It is another object of the present invention to bury waste material which includes asbestos in an asbestos open pit or shaft mine.

It is a further object of the present invention to minimize the contamination and other potential dangers of asbestos open pit and underground shaft mines and return them to conventional land use.

It is still another object of the present invention to deposit waste material which includes asbestos in an open pit or underground shaft mine, cover over the waste material with a non-asbestos material, and repeat this process until the open pit or underground shaft mine is filled, with a top layer filling the mine being a non-asbestos layer, thus returning the land to a usable state.

These and other objects of the invention, as well as many of the intended advantages thereof, will become more readily apparent when reference is made to the following description taken in conjunction with the accompanying drawings.

DETAILED DESCRIPTION OF PREFERRED EMBODIMENTS

In describing a preferred embodiment of the invention illustrated in the drawings, specific terminology will be resorted to for the sake of clarity. However, the invention is not intended to be limited to the specific terms so selected, nor to the specific embodiments described, it being understood that each specific term and embodiment includes all technical equivalents which operate in a similar manner to accomplish a similar purpose.

There are two mineral groups which produce asbestos. Chrysotile or "white" asbestos comes from the serpentine group and is the more widely used variety. The other group of minerals is amphibole whose chief asbestos members are crocidolite (typically blue in color) and amosite (typically ash gray or fawn). Some sources of asbestos have been found in Vermont, Arizona, Georgia, North Carolina, Canada, California, the U.S.S.R., Southern Africa, China, and Italy and other countries.

Asbestos is usually mined by removing the overburden to a depth where commercial open pit mining of the asbestos is acceptable. The ore removed during the open pit mining process contains only about 10 percent asbestos. The direction of the asbestos running in seams in the ore may lie at virtually any incline from horizontal to vertical, thus occasionally necessitating underground shaft mining that may run as deep as nine hundred feet below the surface. Lensatic ore bodies such as ore found in Arizona are also best mined by underground shaft mines.

Figure 2:
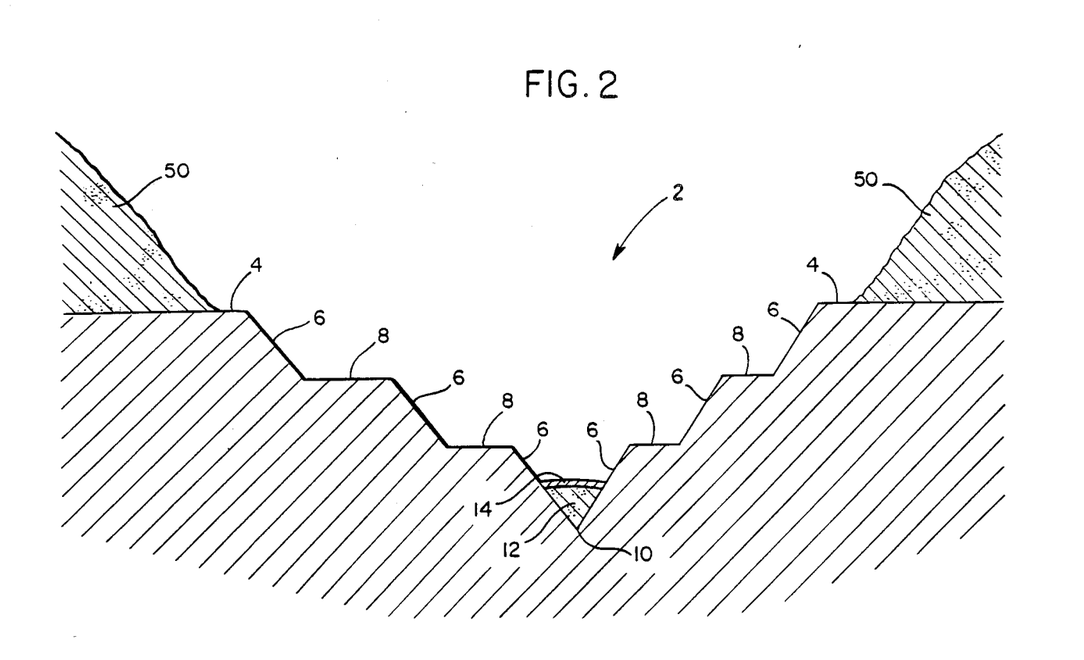
FIG. 2 is a illustration of a first deposit of waste material in an asbestos open pit mine.

Open pit mining may take the form of the mine shown in FIG. 2 where a cut into the earth surface is performed at an angle of approximately 45° followed by a horizontal cut of approximately 35 feet. A cut of 45° is then again made to a predetermined depth. Then, horizontal excavation proceeds for approximately 35 feet. This process is repeated depending on the economics and location of the ore.

Figure 4:
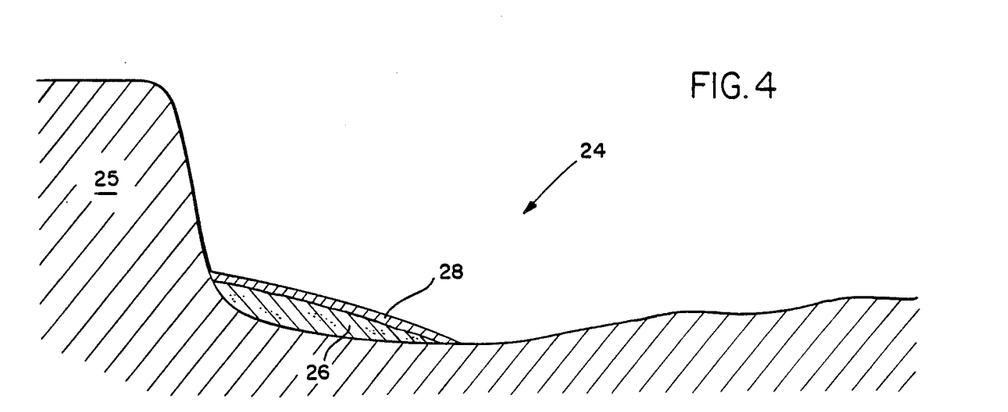
FIG. 4 llustrates a first deposit of waste material in another type of asbestos open pit mine.

In another method of mining, as shown in FIG. 4, a pit or groove is made to a predetermined depth depending on the economics of the ore recovery.

Typically, most open pit mines offer a ready-made pit that is 50 to 150 feet wide and 50 to 75 feet deep and often over a mile in length. Of course, the depth of the pit is increased depending on the depth of the economically viable ore.

Figure 6:
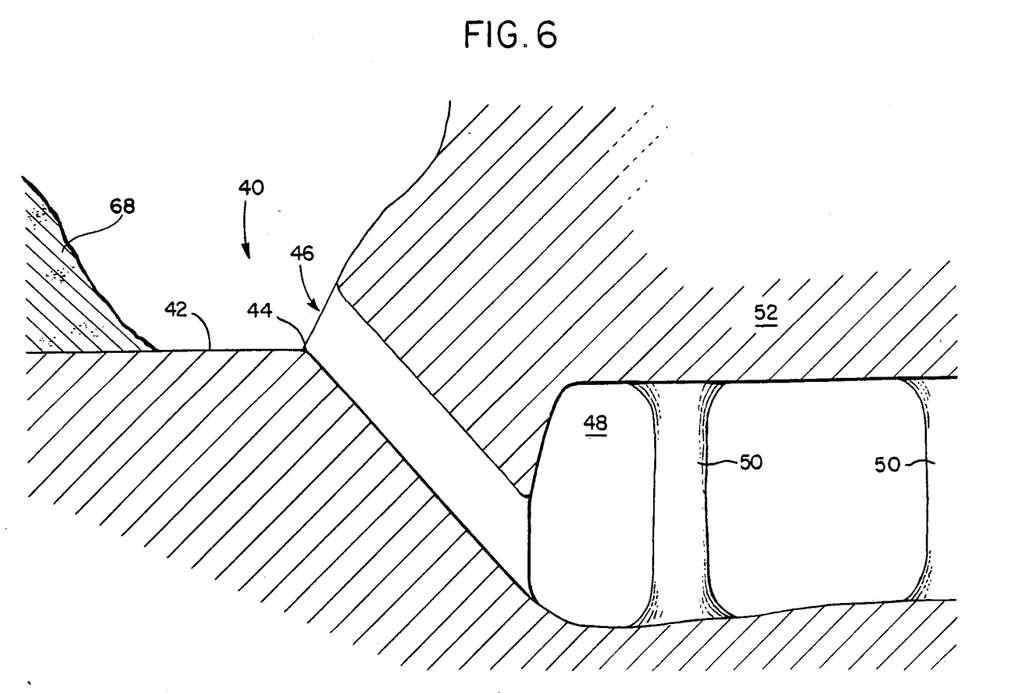
FIG. 6 illustrates an asbestos underground shaft mine.

In FIG. 6, an asbestos underground mine with a mine shaft joining the underground mine and the surface are shown. Underground shaft mines form only a minor portion of all asbestos mining operations. However, an underground shaft mine, as an open pit mine, is ideally suited for the method of the present invention.

A disposal facility for asbestos wastes of the present invention requires meeting current mine site regulations with no visible emissions to the air during disposal and minimizing emissions by covering the waste within 24 hours and with a final cover of non-asbestos material. The minimum required cover is 6 inches of non-asbestos material, normally soil, minesite material (tailings) or a dust suppressing chemical.

An asbestos mine used for receipt of asbestos waste according to the present invention requires its operator to inspect the load of a waste hauler to verify that the asbestos containing waste is properly contained in leak-tight containers and labeled appropriately. In situations when the wastes having leaked from their containers during transit, the operator thoroughly soaks the asbestos containing waste with a water spray prior to unloading, rinses out the truck, and immediately covers the asbestos containing waste with tailings or non-asbestos material.

If improperly containerized waste is received at the mine site, it should be covered immediately after unloading. After the wastes, including properly containerized wastes, are completely covered, the wastes can be compacted or other heavy equipment run over it. During compacting, care should be exercised to avoid exposing wastes to the air from underneath its cover so as to avoid tracking asbestos material away from the trench.

For final closure of an asbestos mine containing asbestos waste, it is covered with at least an additional 36 inches of compacted non-asbestos material such as soil or the like. To control erosion of the final cover, it is properly graded and vegetated.

In areas of the United States where excessive soil erosion may occur or the frost line exceeds three feet, additional final cover should be used. In desert areas where vegetation is difficult to maintain, 3-6 inches of well graded crushed rock is recommended for placement on top of the final cover.

Using an asbestos mine as a solid waste disposal site for waste material which includes asbestos, affords the advantage that excavation of a disposal pit has already been accomplished and access roads previously used to remove asbestos ore for processing are available to use as delivery roads to the disposal site. Non-asbestos cover material from the mining operation is often piled adjacent to the mine site. Offsite water drainage often already exists at the mine site. Waste addition to the site will not increase ground or surface water contamination. These and other similar desirable features serve to reduce the total refuse disposal cost and maintain the existing environmental and ecological situation.

The tailings from the mining operation are stacked in a pile adjacent to the mine. The stack of tailings are often created by a conveyor belt which dumps low quality ore or ore which has had asbestos fibers removed from it. Several tailings piles may rise several hundred feet in the air during the course of a mining operation. The asbestos remaining in the tailings may present an asbestos airborne contamination problem. In addition to the deposit of waste material which includes asbestos in the mine, the tailings may be returned to the mine.

According to the present invention, as shown in FIG. 2, open pit mine 2 is shown extending below the existing surface grade 4 of the adjoining terrain. The open pit mine is dug in a series of steps formed by inclined sides 6 and level areas 8 meeting at inverted pyramid point 10. The tailings 50, which include low grade ore, are piled high into the air at locations adjacent to the mine site to avoid transportation costs. The tailings include ore which has had asbestos removed from it, if a milling operation is located at the mine site.

Taking advantage of the roadways and equipment used to withdraw the asbestos ore from the mine a first deposit of waste material 12 is deposited by a delivery truck or by other known devices, at the bottom of the pit adjacent inverted apex 10. Waste material 12 includes any waste products which include asbestos. In addition, a portion of the tailings is included with each waste material load deposited in the open pit to reduce the size of the tailings pile. Eventually, the tailings pile will be eliminated and returned to the mine from which it originated.

Caution should be exercised in the moving of the tailings to avoid exposure to residual asbestos fibers remaining in the tailings. This may include the use of an isolated booth in a bulldozer or other equipment to prevent the workforce from being exposed to the asbestos fibers released into the air during movement of the tailings. Wetting of the tailings may be used as an aid to prevent airborne contamination.

The waste material 12 may be packaged in 55 gallon drums, plastic bags, or other suitable modes of transporting of waste material which include asbestos contamination, as approved by the EPA. An asbestos containing slurry may be deposite directly in the mine if EPA guidelines are met to contain the slurry. As the waste material is loaded at the bottom of the open pit mine, it is wetted, if any of the waste material packages have opened, to thereby avoid the release of asbestos fibers into the atmosphere.

To minimize the emission of asbestos particles into the atmosphere, the waste material is covered within 24 hours so as to meet mine site regulations. The covering 14 includes at least 6 inches of non-asbestos material, normally soil, tailings, or a dust suppressing chemical.

Figure 3:
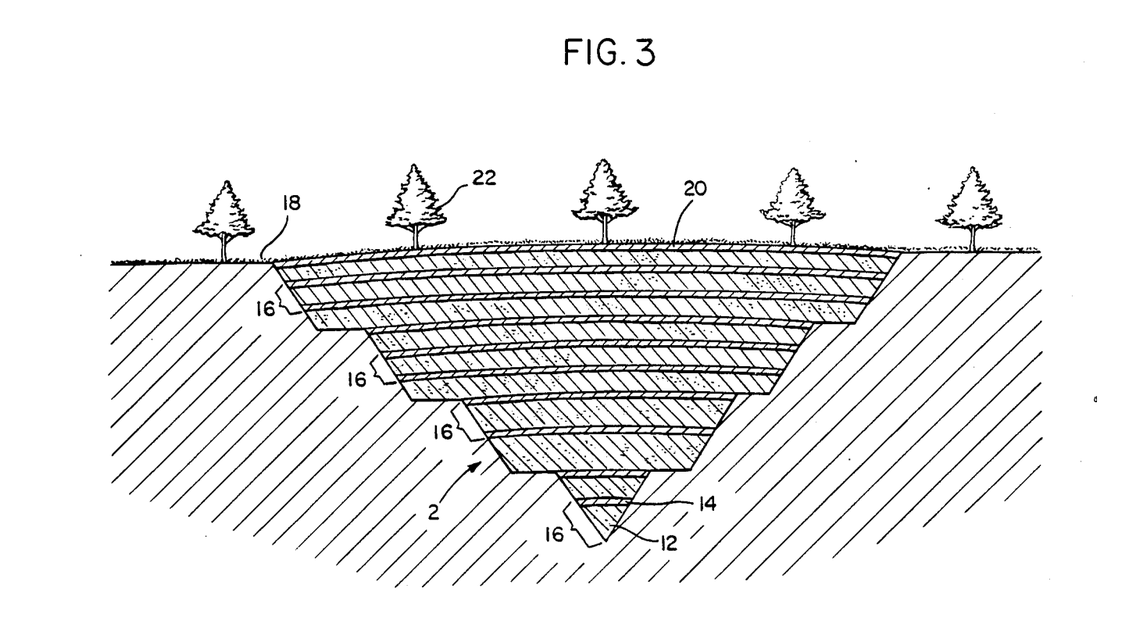
FIG. 3 illustrates several layers of deposits of waste material in an asbestos open pit mine similar to that shown in FIG. 2

As shown in FIG. 3, a series of layers 16 which include waste material deposits 12 and covering layers 14 are used to fill the open pit mine 2 up to the existing surface grade 4. A layer 18 of vegetation is added to the top of the last layer 20 of non-asbestos material. When layer 20 is soil, it may be several feet in depth to support vegetation above the reclaimed strip mined pit. Trees 22 or appropriate vegetation may be added on top of the reclaimed open pit mine and on the surrounding land. The soil used to cover the waste material deposits may be overburden soil which was previously removed from the mine site or soil which is brought to the site to cover the waste material. In addition, a portion of the tailings may be included with each layer of the waste material deposits 12. When completed the surface of the earth appears as if there had never been an open pit mine present.

Due to the dimensions of some open pit mines it is appreciated that while the mine is still active, the covering of asbestos waste materials may be performed at one end of the pit while the other end is still being mined for asbestos. Since the asbestos waste materials which are brought to the inactive portion of the mines are already in EPA approved containers there is no additional risk for the miners working on the still-active portion of the mine.

In FIG. 4, another type of open pit mine 24 is formed as a groove in the earth 25. A waste material deposit 26 is shown located at the base of the pit 24. The waste material deposit includes asbestos material packaged in EPA approved containers. Layer 28 of tailings or non-asbestos covering material is placed on top of waste material deposit 26. Layer 28, if non-asbestos material, can include at least six inches of soil or a dust suppressing chemical.

Figure 5:
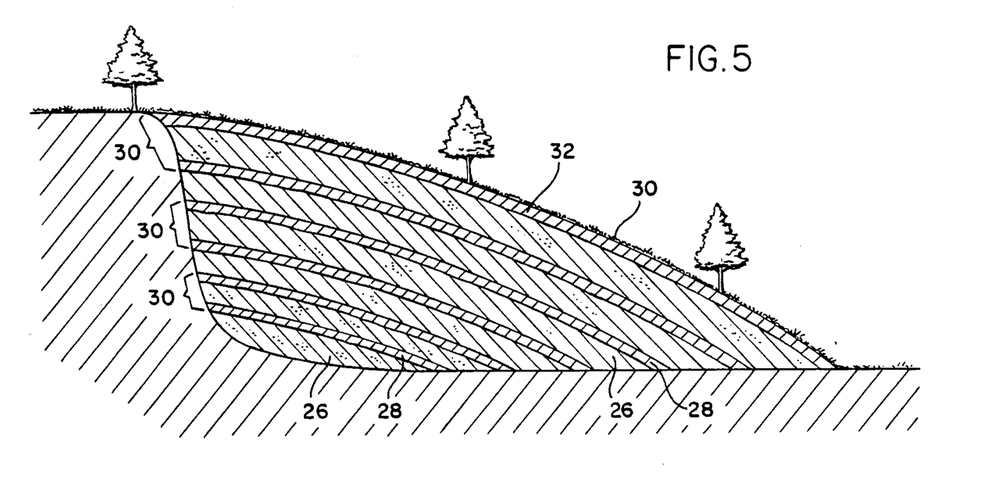
FIG. 5 illustrates several layers of waste material deposited in an asbestos open pit mine similar to that shown in FIG. 4.

As shown in FIG. 5, several layers 30, which include a layer of asbestos waste containing material 26 and a layer 28 of the tailings or non-asbestos material are shown stacked on top of each other to produce a gently sloping hill with vegetation 30 located on top of the top layer 32 of non-asbestos material. The top layer 32, is approximately 3 feet in thickness, and must also be of sufficient depth to support the vegetation being grown on top of the reclaimed asbestos strip mine pit.

Of course, when the filling of the open pit mine is completed, all regulations of the Clean Air Act must be complied with. Compliance may include the fencing of the former mine area and the posting of signs to alert the public of the presence of buried asbestos waste material.

In FIG. 6, an asbestos underground shaft mine 40 is shown. Surface grade 42 includes a road for bringing asbestos waste material to the entrance 44 of the mine shaft 46. A conveyor, elevator, tram, or similar equipment (not shown) which was used to originally bring the asbestos ore from the underground cavern 48 is located in shaft 46 to move asbestos waste material down the shaft 46, back into the cavern 48. The height and depth of the cavern 48 are dependent upon the economic factors considered in mining the asbestos ore. Support pillars 50, formed of unmined ore are scattered throughout the cavern to support the overburden 52 above the cavern. Alternate devices may have been used during the original mining of the asbestos ore to support the roof of the cavern 48.

Figure 7:
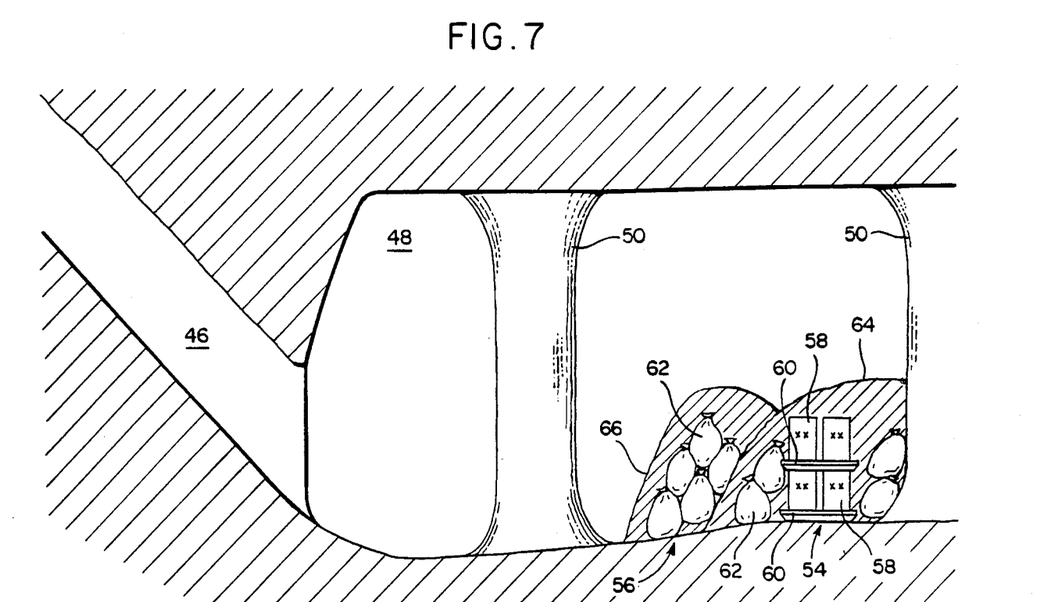
FIG. 7 illustrates several layers of waste material deposited in an asbestos underground shaft mine, similar to that shown in FIG. 6.

In FIG. 7, two asbestos waste material deposits 54 and 56 are shown. In waste deposit 54, two tiers of 55 gallon drums 58 are shown stacked on pallets 60. In addition, four plastic bags containers 62 which include asbestos waste material are shown.

After a twenty-four hour period, the deposited asbestos containing waste containers are buried by tailings or soil covering 64 to seal the asbestos containing waste within the underground cavern 48. Waste material load 56 includes additional bags 62 including asbestos waste material. Load 56 is also covered by a layer of tailings or soil 66 to seal in another twenty-four hour deposit of asbestos waste materials which have been delivered down the shaft 46 by a conveyor, elevator or similar equipment which was originally used to mine ore from the cavern 48. The locating of the asbestos waste material within the cavern and the depositing of a covering on top of the asbestos waste container deposits are performed by known mining equipment.

Tailings pile 68, shown in FIG. 6, may be interdispersed with the waste material deposit or used as interim cover layers so that eventually the tailing pile 68 is eliminated and shaft 46 is filled with soil to return the underground shaft mine site to its original condition, prior to the mining of asbestos.

The filling of open pit and underground shaft mines described for the present invention provides for the safe, permanent disposal of asbestos waste material while simultaneously removing from the exposed environment large piles of tailings which include asbestos fibers. The tailings are presently continuously subjected to winds which carry asbestos fibers over great distances. In addition, the deposit of asbestos waste materials and tailings within asbestos open pit and underground shaft mines, removes the possibility of additional asbestos fibers being removed from the face of these mine areas by the prevailing winds.

Of course, all prevailing Federal and State regulations are intended to be complied with during deposit and covering of waste materials which include asbestos.

In view of the proposed EPA regulations to phase out use of asbestos in all products over the next ten years and ultimately prohibit its use, combined with the planned halting of all domestic production and importation of asbestos, there is a great need for permanent, safe disposal of asbestos waste material. It is conceivable that efforts will be made to replace all known asbestos materials presently being used in daily life.

Having described the invention, many modifications thereto will become apparent to those skilled in the art to which it pertains without deviation from the spirit of the invention as defined by the scope of the appendent claims.

I claim:

1. A method of disposing of asbestos waste material and covering at least a portion of an asbestos mine site, said method comprising:
   locating an open pit asbestos mine from which fibrous asbestos has been removed for processing into useful products, said mine including an exposed surface from which said fibrous asbestos is subject to airborne release to thereby present a health hazard to the public due to potential airborne contamination,
   depositing asbestos waste material into an inactive portion of said mine to cover at least a part of said exposed surface,
   said waste material containing debris of useful products processed from fibrous asbestos, which products even in their processed state, are a health hazard to the public due to potential airborne contamination, and
   covering said deposited asbestos waste material with a non-hazardous material sufficient to cover said deposited waste material to avoid airborne contamination by the previously exposed fibrous asbestos of said exposed surface of said mine, as well as the fibrous asbestos in the debris of the useful products in the asbestos waste material, to thereby minimize exposure to the public of the potential health hazard of both the covered portion of said asbestos mine and said waste material.

2. A method of disposing of waste material as claimed in claim 1, wherein said non-hazardous material is soil.

3. A method of disposing of waste material as claimed in claim 1, wherein said non-hazardous material is a dust suppressing chemical.

4. A method of disposing of waste material as claimed in claim 2, wherein said soil is applied to a depth of at least six inches.

5. A method of disposing of waste material as claimed in claim 1, wherein said waste material is sealed in a series of containers to prevent airborne contamination by said asbestos.

6. A method of disposing of asbestos waste material and covering an asbestos mine site, said method comprising:
   locating an open pit asbestos mine from which fibrous asbestos has been removed for processing into useful products, said mine including an exposed uppermost surface from which said fibrous asbestos is subject to airborne release to thereby present a health hazard to the public due to potential airborne contamination,
   depositing asbestos waste material into an inactive portion of said mine to cover at least part of said exposed surface,
   said waste material containing debris of useful products processed from fibrous asbestos, which products even in their processed state, are a health hazard to the public due to potential airborne contamination,
   covering said deposited asbestos waste material with a non-hazardous material, and repeating the depositing of said asbestos waste material and covering of said waste material until said mine is filled to a level of a pre-existing surface so that said inactive portion of said mine and said deposited waste material is covered and airborne contamination by the previously exposed fibrous asbestos of said exposed surface, as well as the fibrous asbestos in the debris of the useful products of the asbestos waste material, from both said inactive portion of said mine and from said waste material is avoided.

7. A method of disposing of waste material as claimed in claim 6, wherein said non-hazardous material is soil.

8. A method of disposing of waste material as claimed in claim 6, wherein said non-hazardous material is a dust suppressing chemical.

9. A method of disposing of waste material as claimed in claim 8, wherein said soil is applied to a depth of at least six inches above said deposited waste material.

10. A method of disposing of waste material as claimed in claim 6, wherein said waste material is covered with soil to a depth of at least six inches, after each 24-hour period in which any waste material is deposited.

11. A method for sealing off and reclaiming an inactive asbestos mine and disposing of asbestos waste material, said method comprising:

depositing asbestos waste material into an inactive open pit asbestos mine from which fibrous asbestos has previously been removed for processing into useful products, said mine including an exposed surface from which said fibrous asbestos is subject to airborne release to thereby present a health hazard to the public due to potential airborne contamination, said asbestos waste material containing debris of useful products processed from fibrous asbestos, which products even in their processed state, are a health hazard to the public due to potential airborne contamination, and covering said deposited waste material with a non-asbestos material sufficient to seal off said inactive mine and said deposited waste material to avoid airborne contamination by the previously exposed fibrous asbestos of said exposed surface, as well as the fibrous asbestos in the debris of said useful products in the waste material, to thereby dispose of said waste material and restore said inactive mine to a safe condition.

12. A method of disposing of waste material as claimed in claim 11, wherein a top surface of said covering of said deposited waste material is vegetated to be aesthetically consistent with its environs.

13. A method of disposing of waste material as claimed in claim 11, wherein said non-asbestos material is soil.

14. A method of disposing of waste material as claimed in claim 11, wherein said non-asbestos material is a dust suppressing chemical.

15. A method of disposing of waste material as claimed in claim 13, wherein said waste material is covered with soil to a depth of at least six inches, after each 24-hour period in which any waste material is deposited.

16. A method of disposing of asbestos waste material and covering a portion of an asbestos mine site, said method comprising:

locating an asbestos mine from which fibrous asbestos has been removed for processing into useful products and waste mine products, said waste mine products being deposited nearby said mine and including an exposed surface from which fibrous asbestos is subject to airborne release to thereby present a health hazard to the public due to potential airborne contamination, depositing asbestos waste material into an inactive portion of said mine, said waste material containing debris of useful products processed from fibrous asbestos, which products even in their processed state, are a health hazard to the public due to potential airborne contamination, depositing said waste mine products from nearby said mine into said mine along with said asbestos waste material, and sealing said inactive portion of said mine containing said deposited waste material and said deposited waste mine products to avoid airborne contamination by the fibrous asbestos in the debris of said useful products in the waste material and the fibrous asbestos in said waste mine products, to thereby minimize exposure to the public of the potential health hazard of both said waste material and said waste mine products.

17. A method of disposing of waste material as claimed in claim 16, wherein said waste material is sealed in a series of containers to prevent airborne contamination by said asbestos.

18. A method of disposing of asbestos waste material and covering an asbestos mine site, said method comprising:

locating an asbestos mine from which fibrous asbestos has been removed for processing into useful products and waste mine products, said waste mine products being deposited nearby said mine and including an exposed surface from which fibrous asbestos is subject to airborne release to thereby present a health hazard to the public due to potential airborne contamination, depositing asbestos waste material into an inactive portion of said mine, said waste material containing debris of useful products processed from fibrous asbestos, which products even in their processed state, are a health hazard to the public due to potential airborne contamination, covering said deposited waste material with said waste mine products from nearby said mine, repeating the depositing of said waste material and covering of said waste material with the waste mine products from nearby said mine, and covering all exposed waste material and waste mine products deposited in said mine with non-hazardous material, and a top layer of covering being non-hazardous material so as to cover said inactive portion of said mine and cover said deposited waste material and deposited waste mine products to thereby avoid airborne asbestos contamination from the covered inactive portion of said mine, the previously exposed fibrous asbestos of said covered waste mine products, and the fibrous asbestos in the covered debris of said useful waste material, to thereby minimize exposure to the public of the potential health hazard of all the covered portion of said mine, said covered waste mine products and said waste material.

* * * * *